US012726552B2

(12) United States Patent
DeSanti et al.

(10) Patent No.: US 12,726,552 B2
(45) Date of Patent: Sep. 1, 2026

(54) FRAMING FOR PROTOCOL DATA UNITS (PDUS) UTILIZING TRANSMISSION CONTROL PROTOCOL (TCP)

(71) Applicant: DELL PRODUCTS L.P., Round Rock, TX (US)

(72) Inventors: Claudio DeSanti, Santa Cruz, CA (US); Joseph LaSalle White, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 368 days.

(21) Appl. No.: 18/356,049

(22) Filed: Jul. 20, 2023

(65) Prior Publication Data

US 2025/0030785 A1 Jan. 23, 2025

(51) Int. Cl.
*H04L 69/16* (2022.01)
*H04L 9/40* (2022.01)

(52) U.S. Cl.
CPC .......... *H04L 69/161* (2013.01); *H04L 63/166* (2013.01)

(58) Field of Classification Search
CPC ............................ H04L 69/161; H04L 63/166
See application file for complete search history.

(56) References Cited

U.S. PATENT DOCUMENTS 11,221,972 B1 * 1/2022 Raman .................... H04L 67/60
11,252,110 B1 * 2/2022 Malin ................. H04L 49/9057
2022/0052936 A1 * 2/2022 Chandrasekaran .......................... H04L 41/0894
2023/0035799 A1 * 2/2023 Desanti ................. H04L 63/205
2024/0121226 A1 * 4/2024 Danivas ................ H04L 63/166

OTHER PUBLICATIONS

NVM Express®, TCP Transport Specification, Jul. 22, 2021, Revision 1.0a, pp. 1-34.*
Mogul et al., Network Working Group, Request for Comments:1191, Obsoletes: RFC 1063, Path MTU Discovery, 1990. (19pgs).
Culley et al., Network Working Group, Request for Comments:5044, Category: Standards Track, Marker PDU Aligned Framing for TCP Specification, Oct. 2007. (74pgs).
McCann et al., Internet Engineering Task Force (IETF), Request for Comments: 8201, Path MTU Discovery for IP version 6, 2017. (19pgs).

* cited by examiner

*Primary Examiner* — Zhiren Qin
(74) *Attorney, Agent, or Firm* — BAUGH LAW, LLC

(57) ABSTRACT

Presented herein are various embodiments that improve the performance of data handling through improved framing. Embodiments recognize that while the TCP protocol provides a byte stream abstraction, the layer above TCP (e.g., an NVMe layer) is packetized and the layer below TCP is also packetized. In one or more embodiments, by disabling Nagle's algorithm and by starting a new segment each time a protocol data unit (PDU) starts results in the PDU header being positioned immediately after a segment header. A receiver need not search through the entire data field of a segment to find the PDU header. This framing may be further improved by determining the maximum PDU size that can be sent in a single packet and by limiting the size of generated PDUs. Other embodiments and improvements are also presented herein.

20 Claims, 12 Drawing Sheets

NVMe PDU
TCP Segment
PDU Header
PDU Data
TCP Header
TCP Payload 305
310
315
PDU Header
PDU Data
PDU Header
PDU Data
TCP Header
TCP Payload
320
325

NVMe PDU
TCP Segments
PDU Header
PDU Data
TCP Header
TCP Payload
TCP Header
TCP Payload
TCP Header
TCP Payload

1100

1200

FRAMING FOR PROTOCOL DATA UNITS (PDUS) UTILIZING TRANSMISSION CONTROL PROTOCOL (TCP)

BACKGROUND

A. Technical Field

The present disclosure relates generally to information handling systems. More particularly, the present disclosure relates to data handling between information handling systems.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Non-Volatile Memory Express® over Transmission Control Protocol (NVMe/TCP) is an emerging storage networking protocol for storage area network (SAN) deployments able to replace existing protocols such as Fibre Channel. Implementations of NVMe/TCP are beginning to be available on the market (e.g., PowerStore™ and PowerMAX™ provided by Dell, Inc. of Round Rock, Texas). However, in many cases, the performance levels of NVMe/TCP can be lower than the performance levels of Fibre Channel. This performance issue can be a significant reason for concern because customers may be less willing to adopt a technology that performs worse than an existing one. Finding ways to improve the performance of NVMe/TCP is therefore of paramount importance.

Accordingly, it is highly desirable to find new, more efficient ways to improve the performance of protocol data units (PDUs) over TCP.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
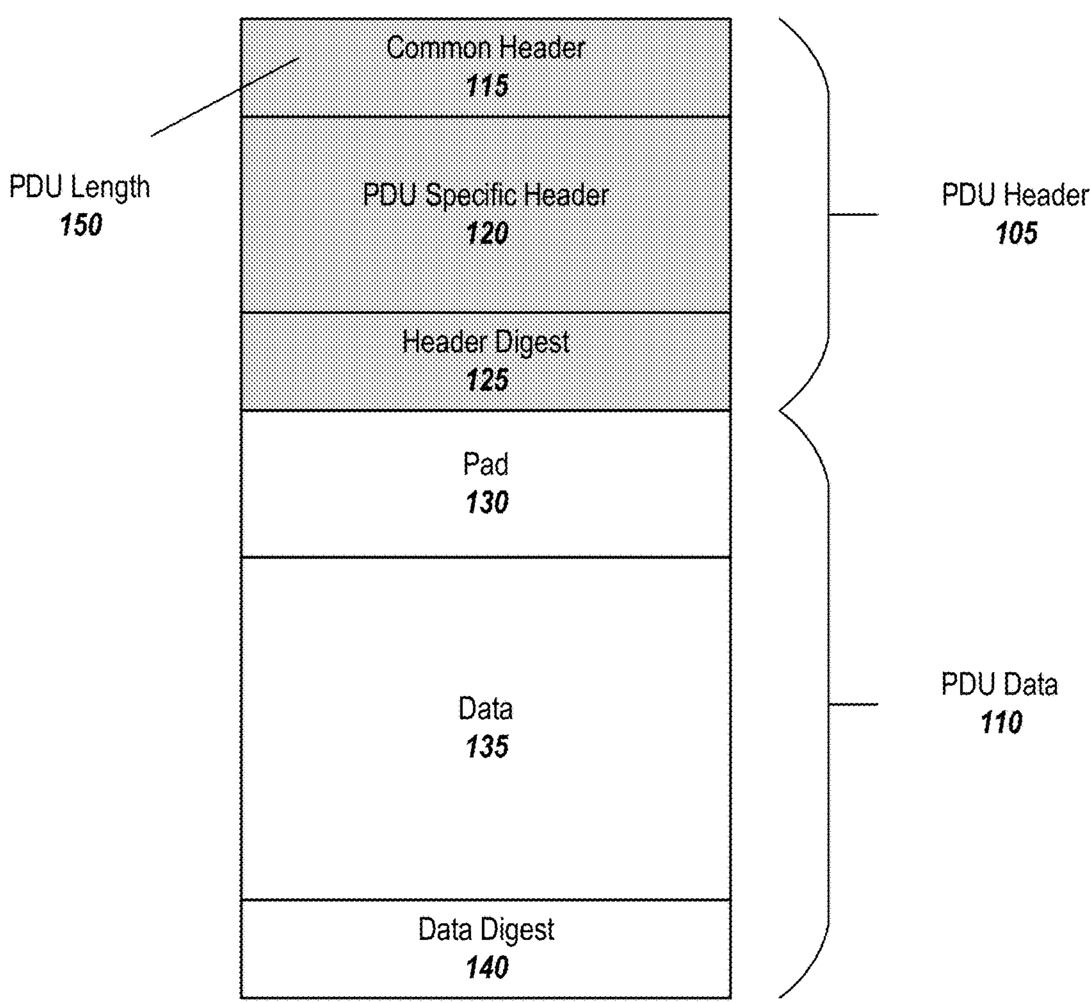
FIG. 1 ("FIG. 1") depicts an example NVMe protocol data unit (PDU) format, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of NVMe/TCP environments, aspects of the present disclosure are not so limited. Accordingly, the aspects of the present disclosure may be applied or adapted for use in other contexts.

A. General Introduction

As noted above, some of the current implementations of NVMe/TCP have performance levels that are lower than the performance levels of competing technologies, such as Fibre Channel. Accordingly, it is important to find ways to improve the performance of NVMe/TCP or similar technologies.

A common way to tackle this issue is through hardware (i.e., offloading the NVMe/TCP processing to specialized coprocessors such as data processing units (DPUs)). However, NVMe/TCP is intended to be a technology supporting a variety of cost points, able to provide good performances on plain Ethernet cards (i.e., without hardware acceleration), accelerated cards (i.e., with some acceleration, such as TCP segmentation and reassembly), and DPUs (i.e., with full hardware acceleration).

Accelerating TCP processing is a well-known desire; however, few, if any, current NVMe/TCP products perform TCP accelerated processing. Hardware offload of TCP is available in some products, even with limitations on the receiver processing. TCP acceleration is usually done at the receiver; however, in contrast, embodiments herein primarily or exclusively change the behavior of the TCP transmitter to enable a more RDMA-like type of processing at a receiver and is valuable for both hardware and software implementations.

One implementation that relates to PDU handling is RFC 5044 (Marker PDU Aligned Framing for TCP Specification) by the Internet Engineering Task Force (IETF), which is incorporated by reference herein in its entirety. RFC 5044 attempts to define how to optimize use of TCP for a packetized upper layer protocol. While the base concept of aligning an upper layer protocol data unit with a TCP segment may be argued to be presented in RFC 5044, embodiments herein differ in at least the following aspects. First, RFC 5044 applies to the Direct Data Placement (DDP) protocol, this patent document applies generally to data units, such as NVMe/TCP protocol data units (PDU). Second, RFC 5044 defines a marker adaptation protocol (MPA) between DDP and TCP and uses that adaptation protocol to define alignment requirements; in contrast, embodiments herein do not introduce a new protocol between NVMe/TCP PDUs and TCP. Third, RFC 5044 assumes a TCP maximum segment size (MSS) large enough to contain MPA PDUs, embodiments herein do not require a TCP MSS large enough to contain NVMe/TCP PDUs (and therefore support different optimizations approached) and can support mapping an NVMe/TCP PDU in one or more TCP segments. Finally, RFC 5044 relies on the MPA framing to handle possible out-of-order segments, embodiments herein do not require any additional framing to mark a TCP segment as the first segment of a PDU.

To address the problems related to PDU data handling and the deficiencies and limitations of existing approaches, presented herein are embodiments that improve the PDU-TCP performance based on protocol framing in general ways so that all types of hardware configurations can benefit.

B. Framing Embodiments

The NVMe protocol is based on the exchange between a host and an NVM subsystem of self-contained packets of data called Protocol Data Units (PDUs). FIG. 1 graphically illustrates the structure of a typical NVMe PDU.

As illustrated in FIG. 1, an NVMe PDU 100 may comprise two main parts: a PDU header 105 and PDU data 110. Typically, the PDU header 105 includes an 8-byte common header 115, a variable length PDU specific header 120, and a 4-byte header digest 125. The common header 115 includes a value for the overall length 150 of the PDU 100. The PDU data portion 110 may include a variable length pad field 130, a variable length data field 135, and a 4-byte data digest 140. Note that the PDU data field 110 is optional: some PDUs have it (e.g., Command Capsule PDU, Host to Controller Data PDU, and Controller to Host Data PDU) and some do not have it (e.g., Response Capsule PDU and Ready to Transfer PDU).

Figure 2A:
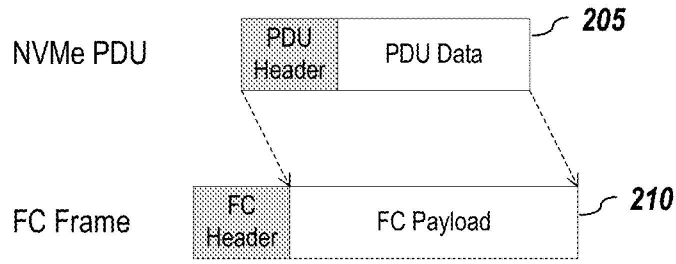
FIG. 2A & FIG. 2B depict examples of NVMe PDU mappings over Fibre Channel.
Figure 2B:
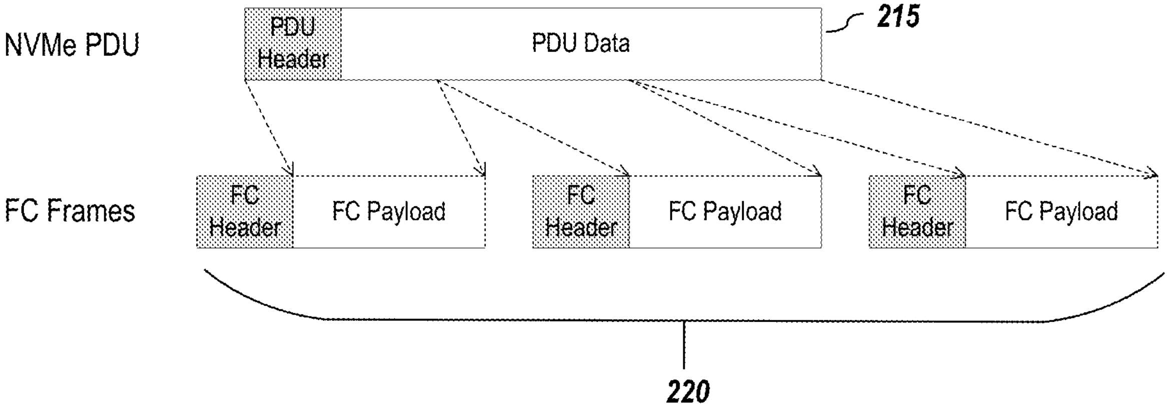

When NVMe is used over Fibre Channel (such as defined by FC-NVMe), each NVMe PDU is mapped into a Fibre Channel Sequence, a hardware-supported set of Fibre Channel frames. In other words, there is a simple mapping between NVMe PDUs and Fibre Channel frames, either mapping a PDU 205 to a Fibre Channel frame 210, as shown in FIG. 2A, or mapping a PDU 215 to a Fibre Channel Sequence 220, as shown in FIG. 2B. This simple mapping enables the protocol processing by a receiver on a frame-by-frame basis, making it easier to achieve good performance.

When NVMe is used over TCP (such as defined by NVMe/TCP), each NVMe PDU may be mapped into the byte stream abstraction provided by TCP. The TCP byte stream may then be segmented into TCP segments that are mapped into IP packets.

Figures 3A, 3B, 3C:
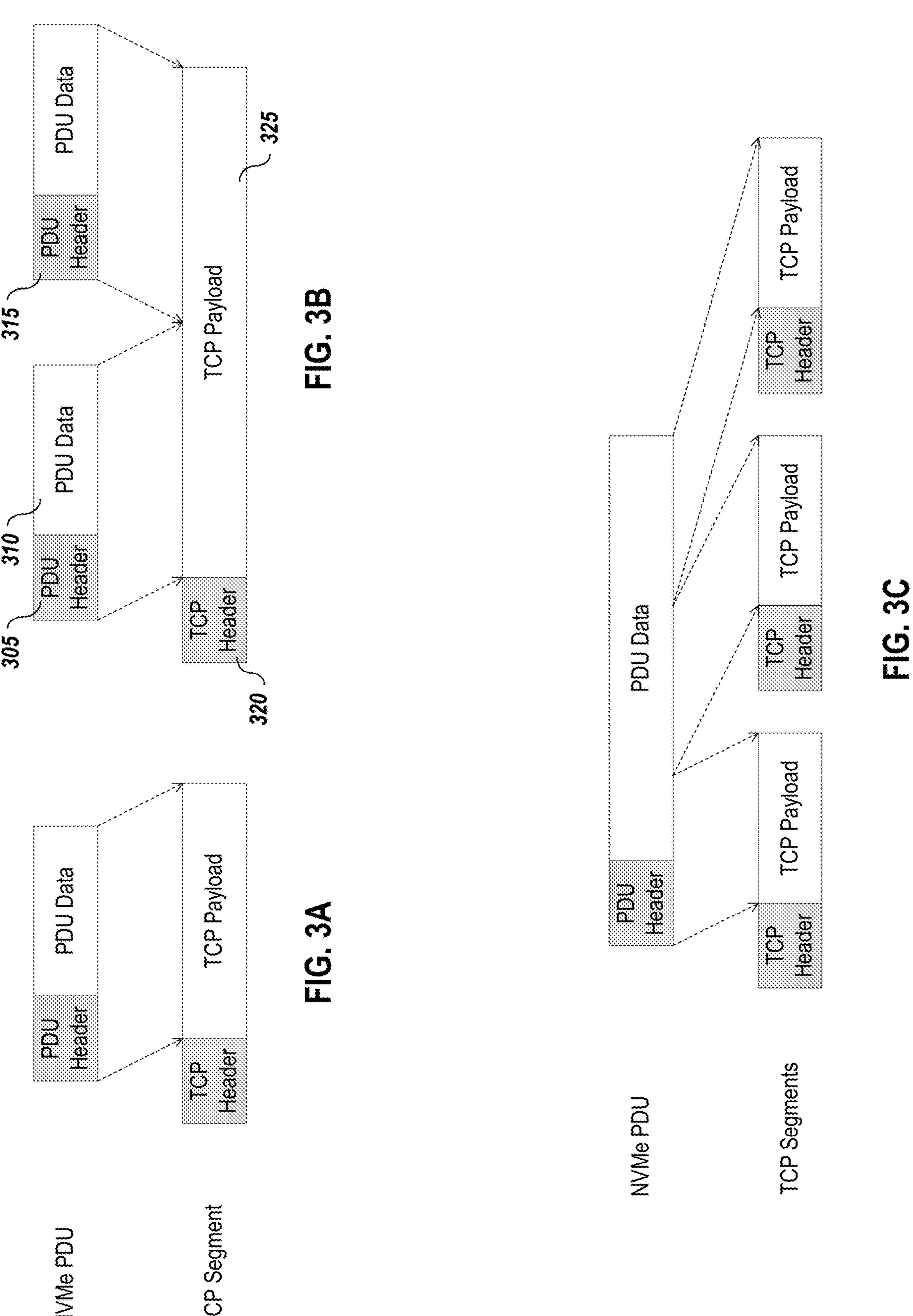
FIGS. 3A-C depict NVMe PDU mappings over TCP/IP (Transmission Control Protocol/Internet Protocol).

The result is the lack of a fixed relationship between NVMe PDUs and IP packets. For example, a PDU may be mapped to a single TCP segment, as shown in FIG. 3A, or multiple PDUs may be packed together in a single TCP segment, as shown in FIG. 3B, or a PDU may be spread across multiple TCP segments, as shown in FIG. 3C.

Figure 4:
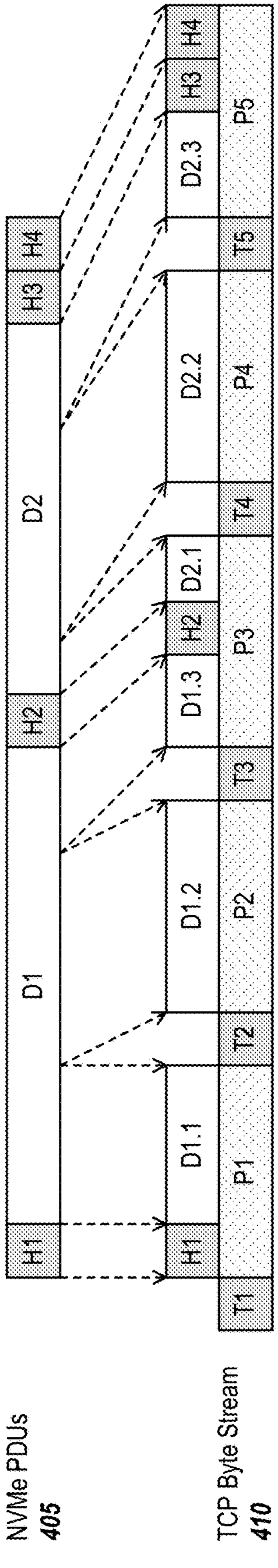
FIG. 4 graphically depicts a framing example when multiple PDUs are mapped over a TCP byte stream.

Protocol processing by an NVMe/TCP receiver is then quite complex due to the resulting NVMe/TCP framing. FIG. 4 shows a framing example when multiple PDUs 405 are mapped over a TCP byte stream 410.

In the example of FIG. 4, four PDUs are mapped into five TCP segments. PDUs 1 and 2 have data, PDUs 3 and 4 do not have data (e.g., they may be Response Capsule PDUs). PDU 1 is spread across TCP segments 1, 2, and 3. PDU 2 is spread across TCP segments 3, 4, and 5. PDUs 3 and 4 fit in TCP segment 5.

FIG. 4 illustrates the fundamental problem of the NVMe/TCP framing-except for PDU 1, no PDU header is adjacent to a TCP header, thereby making it difficult to optimize the TCP processing. In general, a set of received IP packets carrying TCP segments is processed at the TCP layer to reconstruct the TCP stream. It is then possible to scan the TCP stream looking for PDU headers (that include a PDU length field) to isolate each NVMe PDU and pass it to the NVMe layer for further processing. This TCP layer processing makes it more difficult for NVMe/TCP to achieve the same performance levels of packet-based protocols (such as Fibre Channel) and is often sought for offload to hardware.

In one or more embodiments, the performance of NVMe/TCP may be improved by defining a mechanism to make its processing at a receiver packet based. This mechanism enables defining a fast-path processing with improved performances at a receiver. One of the core concepts is to avoid having to scan the TCP stream looking for PDU headers by disallowing mappings in which PDU headers are not immediately after the TCP header. For example, in the mapping in FIG. 3B, the PDU header 305 of the first PDU will immediately follow the TCP header 320. However, the second PDU's header 315 will follow after the first PDU's data 310 and will be in the interior of the TCP payload 325 of the TCP segment. Thus, the TCP payload 325 will have to be scanned to find the second PDU's header 315.

TCP framing usually follows Nagle's algorithm, which attempts to pack as many bytes as possible of the upper layer PDUs in a TCP segment to optimize the packet rate and use of bandwidth between a sender and a receiver. The result of implementing Nagle's algorithm is a smaller number of TCP segments, as shown in FIG. 4, but it comes at the expense of higher latency and more complex processing at the receiver.

For NVMe/TCP, the NVMe PDU structure is known, and it is known that a better optimization to achieve low latency and easier processing at a receiver would be beneficial. Given that is acceptable to use more TCP segments, Nagle's algorithm may be disabled at a transmitter (e.g., using a TCP_NODELAY option), and an improved framing may be used to achieve increased performance. The TCP framing may be improved by placing each PDU header immediately after a TCP header. In one or more embodiments, placing each PDU header immediately after a TCP header may be implemented by starting a new TCP segment each time a PDU starts. Such a rule may also be followed for fast retransmits and retransmission timeouts (RTOs) (slow start) retransmits. The resulting framing is shown in FIG. 5.

Figure 5:
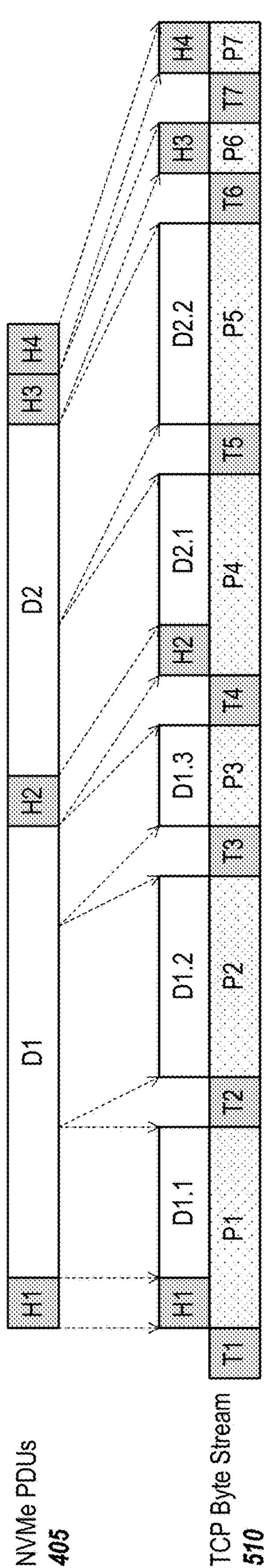
FIG. 5 graphically depicts an improved framing when multiple PDUs are mapped over a TCP byte stream, according to embodiments of the present disclosure.

In the example in FIG. 5, the same four PDUs of FIG. 4 are mapped in seven TCP segments rather than five as in FIG. 4; however, in FIG. 5, each PDU header is adjacent to a TCP header in the seven TCP segments in the depicted TCP byte stream 510. This rule of starting a new TCP segment each time a PDU starts disallows the mapping shown in FIG. 3B, leaving only the mappings shown in FIG. 3A and FIG. 3C. It shall be noted that such an implementation also makes the NVMe/TCP framing essentially mirrors the one of Fibre Channel.

Figure 6:
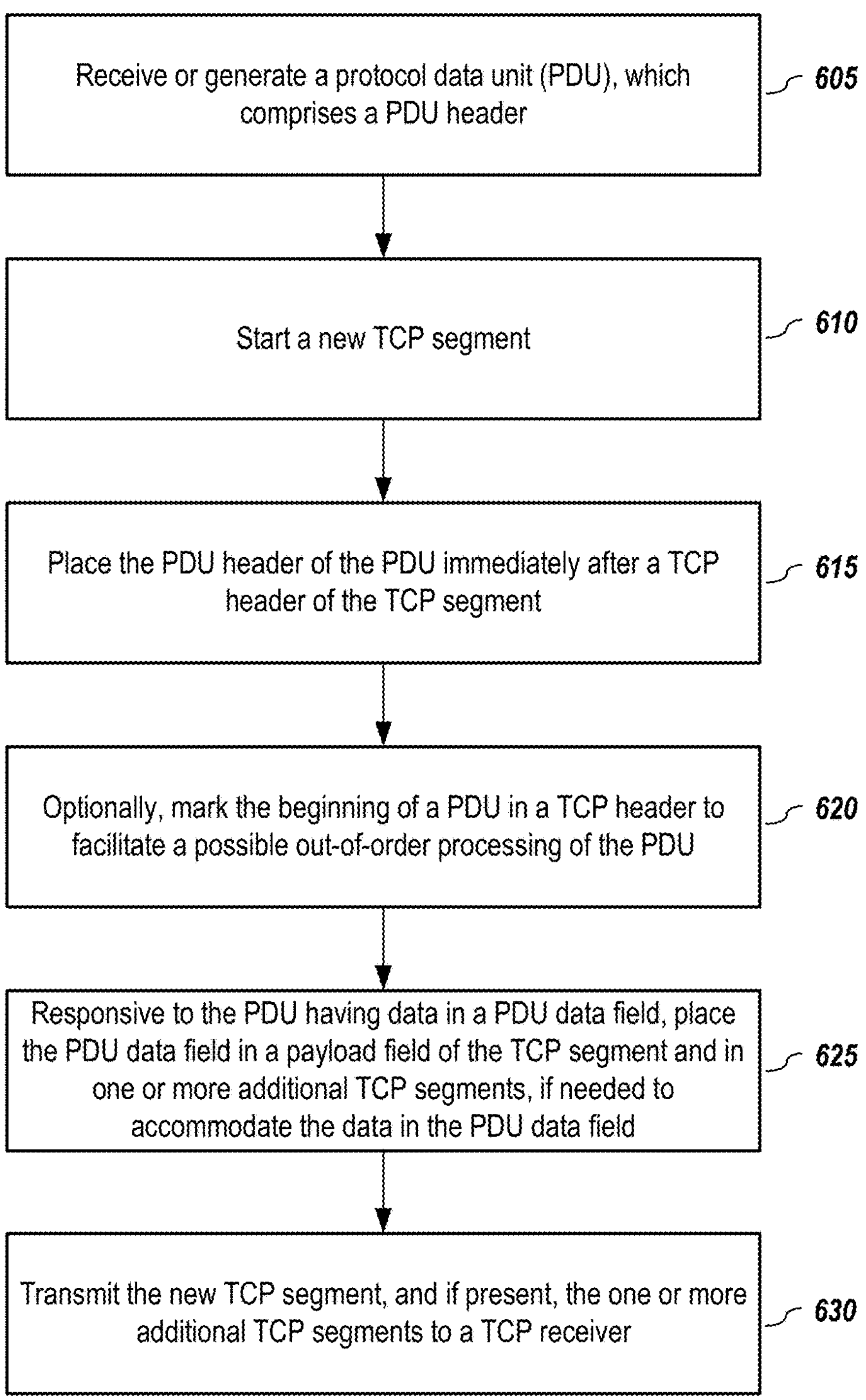
FIG. 6 depicts a methodology for handling a PDU by a transmitter, according to embodiments of the present disclosure.

FIG. 6 depicts a methodology for handling a PDU by a transmitter, according to embodiments of the present disclosure. In one or more embodiments, at a TCP transmitter, for each protocol data unit (PDU) that is received or generated (605), a new TCP segment is started (610). The TCP transmitter places (615) the PDU header of the PDU immediately after a TCP header of the TCP segment. In one or more embodiments, the beginning of a PDU may be marked (620) in a TCP header to facilitate a possible out-of-order processing of the PDU.

Depending upon whether the PDU has data in a PDU data field and depending upon the size of the data in the PDU data field relative to the size of the TCP segment, the data in the PDU data field may be placed (625) in a payload field of the TCP segment and, if needed to fully accommodate the data in the PDU data field, in one or more additional TCP segments. Note that if the TCP transmitter generates each PDU so that it is sized to fit within one TCP segment, no additional TCP segments would be required. Finally, after the PDU has been mapped into the TCP segment(s), the TCP transmitter may transmit (630) the one or more TCP segments to a TCP receiver. It shall be noted that when one or more one TCP segment is used to handle a single PDU, the TCP transmitter need not wait until all the TCP segments have been generated in order to transmit them.

Figure 7:
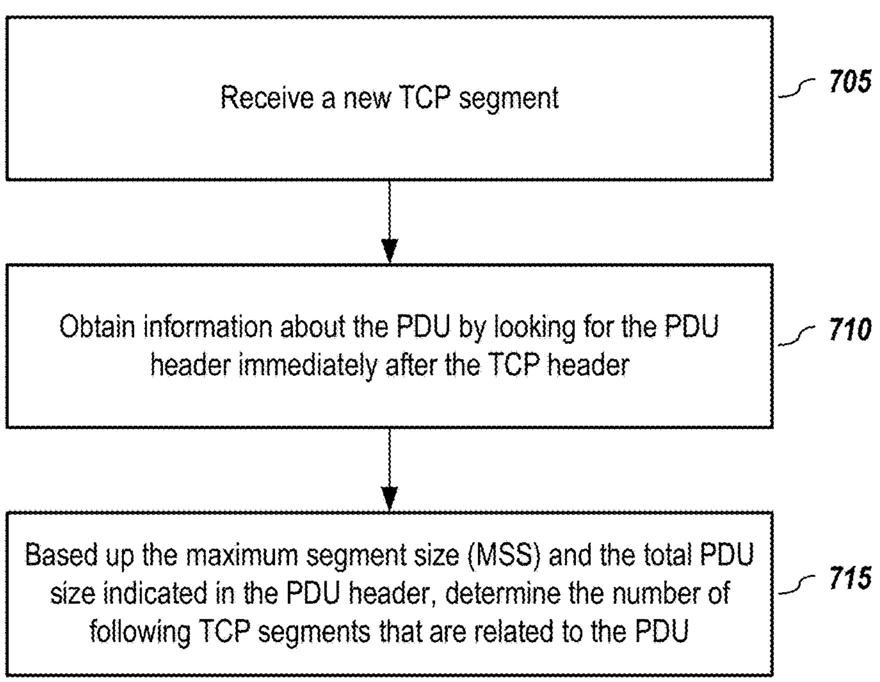
FIG. 7 depicts a methodology for handling data traffic by a receiver, according to embodiments of the present disclosure.

Such a configuration allows a packet-by-packet processing at the receiver, making the TCP processing easier. FIG. 7 depicts a methodology for handling data traffic by a receiver, according to embodiments of the present disclosure. A receiver receives (705) a TCP segment, and the receiver may obtain (710) information about the PDU contained within the TCP segment by looking for the PDU header immediately after the TCP header. Because all NVMe/TCP PDUs begin with an 8-byte common header indicating the length of the PDU (e.g., in bytes 4:7), the receiver can readily obtain the total size of the PDU. By using this PDU size information and the TCP Maximum Segment Size (MSS), the receiver may determine (715) how many additional segments to expect to complete reception of the full PDU.

Considering the example shown in FIG. 5, upon receiving the first TCP segment, the TCP receiver is able to compute that two more segments are needed to complete reception of that PDU. This optimization is especially valuable for Ethernet cards supporting offloading TCP segmentation and reassembly, because they can offload the mapping shown in FIG. 3C. Support for this improved framing may be indicated to the other party (i.e., the receiver) during an NVMe/TCP initialization process (e.g., by signaling it in the ICReq and ICResp payloads).

Figure 8:
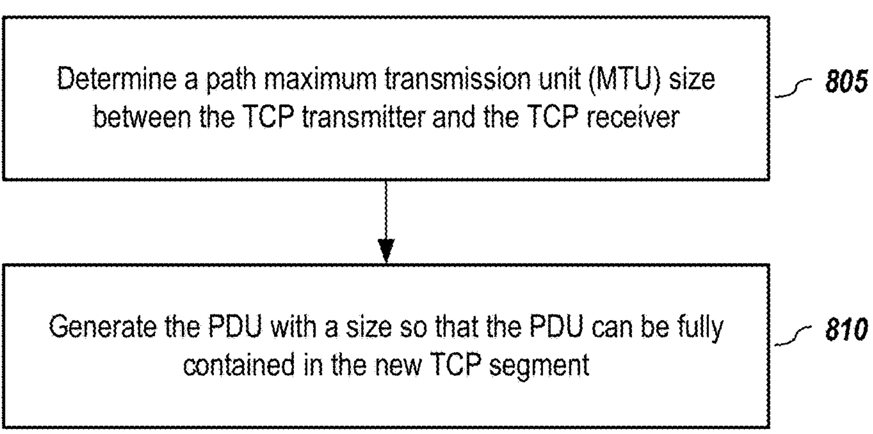
FIG. 8 depicts a methodology for improved PDU handling, according to embodiments of the present disclosure.

In one or more embodiments, an additional improvement may be implemented when a sender/transmitter and a receiver know the maximum transfer unit (MTU) they can use on the link/channel connecting them. FIG. 8 depicts a methodology for improved PDU handling, according to embodiments of the present disclosure. Identifying the path MTU may be achieved by performing a path MTU discovery procedure (e.g., RFC 1191 and RFC 8201, which is incorporated by reference herein in their entireties). For example, if an NVMe host and an NVM subsystem are connected by an Ethernet link supporting jumbo frames, the host and subsystem can identify or determine (805) that they can send Ethernet frames as big as 9000 bytes.

Figure 9:
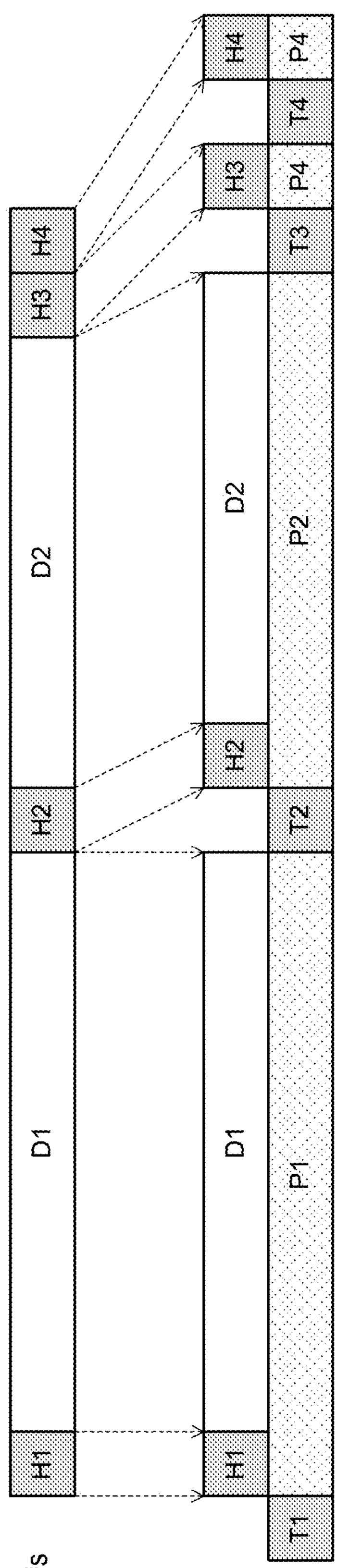
FIG. 9 graphically depicts an improved framing in which PDUs are limited by maximum transmission unit size to allow one-to-one mapping, according to embodiments of the present disclosure.

This information enables an NVMe/TCP sender to determine the maximum NVMe PDU size that can be sent in a single IP packet. An NVMe sender may then generate (810) only PDUs having a maximum PDU size so that each PDU can be fully encapsulated in a separate IP packet. This allows mapping each NVMe PDU to exactly one IP packet, as shown in FIG. 3A. This improvement is especially valuable for Ethernet cards without any hardware acceleration. FIG. 9 shows the resulting framing, in which each NVMe PDU is mapped to one TCP segment.

In one or more embodiments, a receiver may verify if a received IP packet encapsulates exactly one NVMe PDU by doing a simple length check. All NVMe/TCP PDUs begin with an 8-byte common header indicating the length of the PDU in bytes 4:7. The length of the TCP header is 20 bytes as well as the length of an IPv4 header. Therefore, for an IPV4 packet, if the PDU length+40=length of the IPv4 packet, then this packet encapsulates exactly one NVMe PDU.

An IPv6 header is 40 bytes long, therefore the check for an IPv6 packet becomes PDU length+60=length of the IPv6 packet. If this check is true, then the packet can be processed by the fast-path processing, otherwise it needs the slower full TCP processing.

The improvements discussed above enable easier processing of the TCP byte stream at the receiver without altering the TCP properties. However, given that all the data transmitted by NVMe/TCP is packaged in PDUs, it may be valuable also to allow PDUs to be processed out of order at a receiver (e.g., in case of a TCP retransmission). In one or more embodiments, this out-of-order processing may be enabled by providing in the TCP header a way to mark a specific TCP segment as the first segment of an NVMe PDU. As an example, referring to FIG. 5, segments 1, 4, 6, and 7 may be marked. In this way, if any of the segments of PDU 1 is lost and needs retransmission, the receiver may detect that a subsequent PDU (e.g., PDU 2) is being received and may process it without waiting for full reception of the retransmitted PDU.

In one or more embodiments, a special value of the Urgent Pointer field of the TCP header with the URG flag set to zero may be used to perform this marking. This option may not be appropriate for a standard socket interface (that is expected to deliver data as a byte stream in strict order); however, it may be very useful for a PDU optimized interface to the TCP layer.

In one or more embodiments, improvements may be implemented related to TLS (Transport Layer Security) processing. In one or more embodiments, one or more of the improvements described for TCP may be extended also to improve the processing of TLS records. TLS is a secure channel protocol based on records that are mapped to TCP segments. The protocol is generally optimized for bandwidth, not for low latency and easiness of processing at a receiver.

Figure 10:
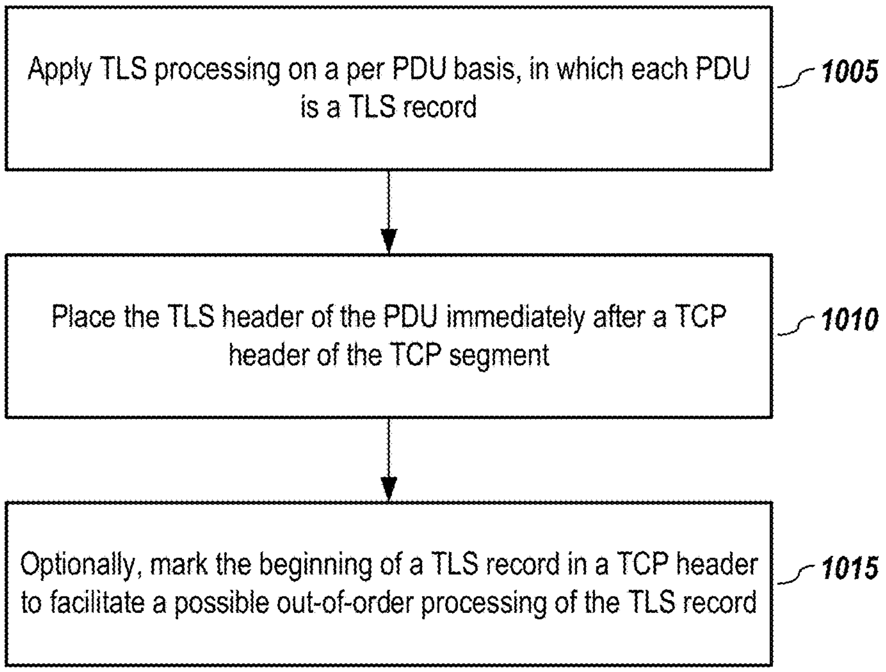
FIG. 10 depicts a methodology for improved PDU handling involving TLS (Transport Layer Security), according to embodiments of the present disclosure.

FIG. 10 depicts a methodology for improved PDU handling involving TLS (Transport Layer Security), according to embodiments of the present disclosure. In one or more embodiments, the TLS processing may be applied (1005) on a per PDU basis (e.g., make each NVMe PDU a TLS record). Each TLS header may be placed (1010) immediately after a TCP header (i.e., by starting a new TCP segment each time a TLS record starts), which may require the Nagle's algorithm implemented on the transmitted to be disabled. Finally, as an optional step, the beginning of a TLS record may be marked (1015) by marking in a TCP header a special value (e.g., the Urgent Pointer field of the TCP header may be marked with the URG flag set to zero to indicate a possible out-of-order processing of the TLS record). In this way also the TLS framing may become as shown in FIG. 6.

Presented herein are various embodiments that improve the performance of data handling through improved framing. Embodiments recognize that while the TCP protocol provides a byte stream abstraction, the layer above TCP (e.g., an NVMe layer) is packetized and the layer below TCP is also packetized. In one or more embodiments, by disabling Nagle's algorithm and by starting a new segment each time a protocol data unit (PDU) starts results in the PDU header being positioned immediately after a segment header. A receiver need not search through the entire data field of a segment to find the PDU header. This framing may be further improved by determining the maximum PDU size that can be sent in a single packet and by limiting the size of generated PDUs.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory.

Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 11:
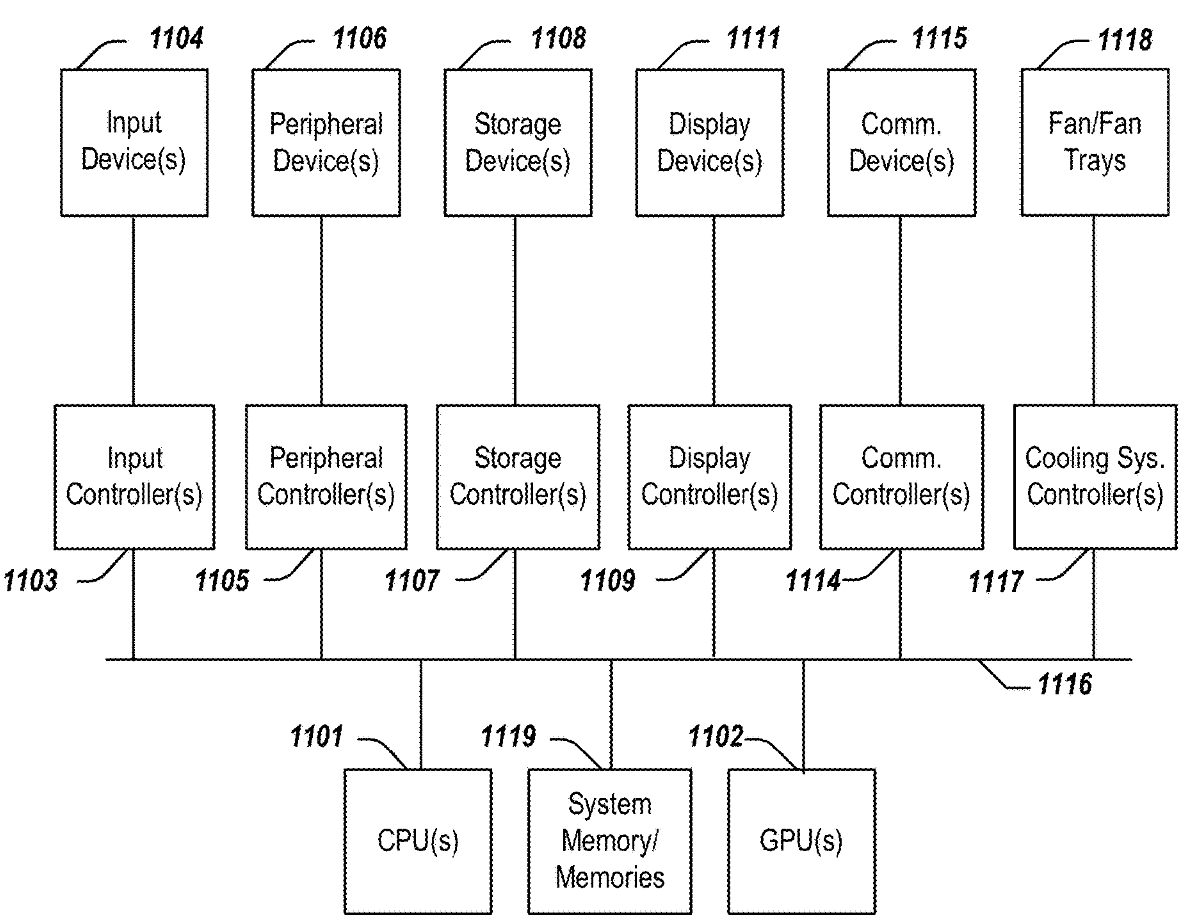
FIG. 11 depicts a simplified block diagram of an information handling system, according to embodiments of the present disclosure.

FIG. 11 depicts a simplified block diagram of an information handling system (or computing system), according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more CPUs 1101 that provides computing resources and controls the computer. CPU 1101 may be implemented with a microprocessor or the like and may also include one or more graphics processing units (GPU) 1102 and/or a floating-point coprocessor for mathematical computations. In one or more embodiments, one or more GPUs 1102 may be incorporated within the display controller 1109, such as part of a graphics card or cards. The system 1100 may also include a system memory 1119, which may comprise RAM, ROM, or both.

A number of controllers and peripheral devices may also be provided, as shown in FIG. 11. An input controller 1103 represents an interface to various input device(s) 1104, such as a keyboard, mouse, touchscreen, stylus, microphone, camera, trackpad, display, etc. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT) display, a thin film transistor (TFT) display, organic light-emitting diode, electroluminescent panel, plasma panel, or any other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1100 comprises one or more fans or fan trays 1118 and a cooling subsystem controller or controllers 1117 that monitors thermal temperature(s) of the system 1100 (or components thereof) and operates the fans/fan trays 1118 to help regulate the temperature.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 12:
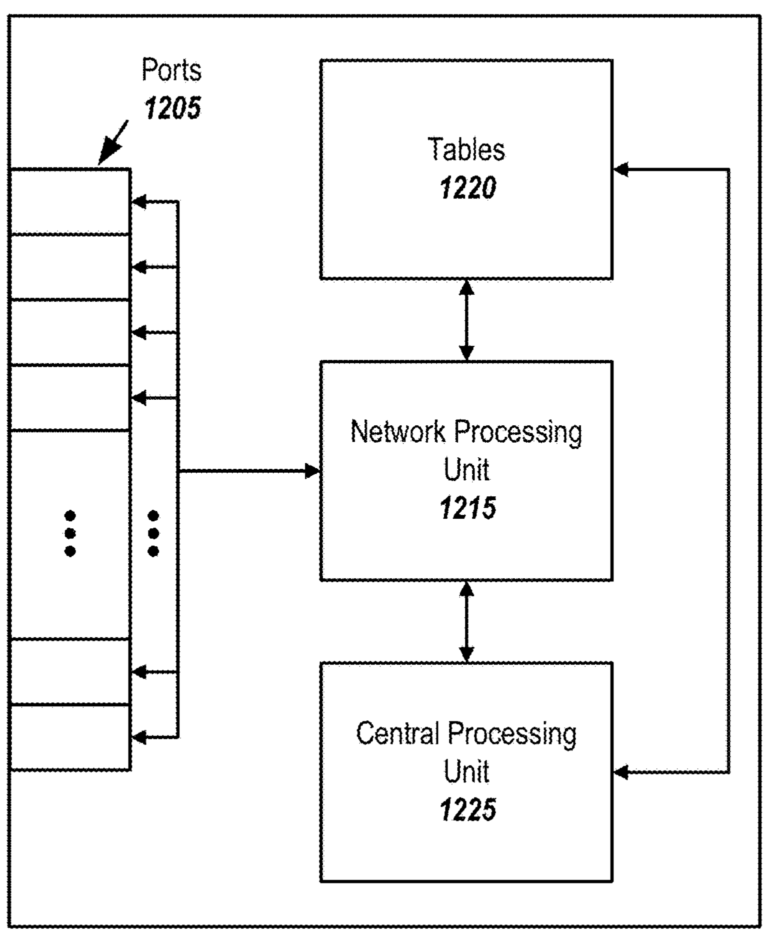
FIG. 12 depicts an alternative block diagram of an information handling system, according to embodiments of the present disclosure.

FIG. 12 depicts an alternative block diagram of an information handling system, according to embodiments of the present disclosure. It will be understood that the functionalities shown for system 1200 may operate to support various embodiments of the present disclosure—although it shall be understood that such system may be differently configured and include different components, additional components, or fewer components.

The information handling system 1200 may include a plurality of I/O ports 1205, a network processing unit (NPU) 1215, one or more tables 1220, and a CPU 1225. The system includes a power supply (not shown) and may also include other components, which are not shown for sake of simplicity.

In one or more embodiments, the I/O ports 1205 may be connected via one or more cables to one or more other network devices or clients. The network processing unit 1215 may use information included in the network data received at the node 1200, as well as information stored in the tables 1220, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented/processor-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A processor-implemented method for transmitting from a transmitter one or more Non-Volatile Memory Express (NVMe) protocol data units (PDUs), the method comprising:

in response to a payload of an existing transmission control protocol (TCP) segment being partially full and having space to include at least part of an NVMe PDU that comprises a PDU header:

starting a new TCP segment;

placing the PDU header of the NVMe PDU immediately after a TCP header of the new TCP segment; and responsive to the NVMe PDU having data in a PDU data field, placing the PDU data field in a payload field of the new TCP segment and in one or more additional TCP segments, if needed to accommodate the data in the PDU data field; and transmitting the new TCP segment and, if created, the one or more additional TCP segments to a receiver.

2. The processor-implemented method of claim 1 further comprising:

including a total size of the NVMe PDU in a field in the NVMe PDU, which is used by the receiver to determine how many additional TCP segments, if any, to expect to completely receive the NVMe PDU.

3. The processor-implemented method of claim 1 further comprising:

applying TLS (Transport Layer Security) processing on a per NVMe PDU basis.

4. The processor-implemented method of claim 1 further comprising:

determining a path maximum transmission unit (MTU) size for a communication channel between the transmitter and the receiver; and generating the NVMe PDU with a size so that the NVMe PDU can be fully contained in the new TCP segment.

5. The processor-implemented method of claim 1 further comprising:

identifying to the receiver that the transmitter operates by placing the PDU header of an NVMe PDU immediately after the TCP header of a TCP segment.

6. The processor-implemented method of claim 5 wherein the step of identifying to the receiver that the transmitter operates by placing the PDU header of the NVMe PDU immediately after the TCP header of the TCP segment is performed as part of an initialization phase between the transmitter and the receiver.

7. The processor-implemented method of claim 1 further comprising:

marking the new TCP segment as being a first TCP segment of one or more TCP segments comprising data related to the NVMe PDU.

8. One or more information handling systems operating as a transmitter comprising:

one or more processors; and one or more non-transitory computer-readable medium or media comprising one or more sets of instructions which, when executed by at least one of the one or more processors, cause steps to be performed comprising:

in response to a payload of an existing transmission control protocol (TCP) segment being partially full and having space to include at least part of a Non-Volatile Memory Express (NVMe) protocol data unit (PDU) that comprises a PDU header:

starting a new TCP segment;

placing the PDU header of the NVMe PDU immediately after a TCP header of the new TCP segment; and responsive to the NVMe PDU having data in a PDU data field, placing the PDU data field in a payload field of the new TCP segment and in one or more additional TCP segments, if needed to accommodate the data in the PDU data field; and transmitting the new TCP segment and, if created, the one or more additional TCP segments to a receiver.

9. The one or more information handling systems of claim 8 wherein the one or more non-transitory computer-readable medium or media further comprise one or more sets of instructions which, when executed by at least one of the one or more processors, cause steps to be performed comprising:

including a total size of the NVMe PDU in a field in the NVMe PDU, which is used by the receiver to determine how many additional TCP segments, if any, to expect to completely receive the NVMe PDU.

10. The one or more information handling systems of claim 8 wherein the one or more non-transitory computer-readable medium or media further comprise one or more sets of instructions which, when executed by at least one of the one or more processors, cause steps to be performed comprising:

applying TLS (Transport Layer Security) processing on a per NVMe PDU basis.

11. The one or more information handling systems of claim 8 wherein the one or more non-transitory computer-readable medium or media further comprise one or more sets of instructions which, when executed by at least one of the one or more processors, cause steps to be performed comprising:

marking a TCP segment that comprises a beginning of an NVMe PDU with an indicator indicating that TCP segments may be processed out of order by the receiver.

12. The one or more information handling systems of claim 8 wherein the one or more non-transitory computer-readable medium or media further comprise one or more sets of instructions which, when executed by at least one of the one or more processors, cause steps to be performed comprising:

determining a path maximum transmission unit (MTU) size for a communication channel between the transmitter and the receiver; and given the MTU size, generating the NVMe PDU with a size so that the NVMe PDU is mappable to one TCP segment.

13. The one or more information handling systems of claim 8 wherein the one or more non-transitory computer-readable medium or media further comprise one or more sets of instructions which, when executed by at least one of the one or more processors, cause steps to be performed comprising:

identifying to the receiver that the transmitter operates by placing the PDU header of an NVMe PDU immediately after the TCP header of a TCP segment.

14. The one or more information handling systems of claim 8 wherein the one or more non-transitory computer-readable medium or media further comprise one or more sets of instructions which, when executed by at least one of the one or more processors, cause steps to be performed comprising:

marking the new TCP segment as being a first TCP segment of one or more TCP segments comprising data related to the NVMe PDU.

15. A processor-implemented method comprising:

given a Non-Volatile Memory Express (NVMe) protocol data unit (PDU) having a total size that is included in a field in the PDU:

placing, by a transmitter, a PDU header of the NVMe PDU immediately after a transmission control protocol (TCP) header of a new TCP segment that is started for the NVMe PDU;

responsive to the NVMe PDU having data in a PDU data field, placing the data of the PDU data field in a TCP segment payload of the new TCP segment and in one or more additional TCP segments, if needed to accommodate the data in the PDU data field; and transmitting the new TCP segment and, if present, the one or more additional TCP segments to a receiver.

16. The processor-implemented method of claim 15 further comprising:

determining a path maximum transmission unit (MTU) size for a communication channel between the transmitter and the receiver; and given the MTU size, generating the NVMe PDU with a size so that the NVMe PDU can be fully contained in the new TCP segment.

17. The processor-implemented method of claim 15 further comprising:

identifying to the receiver that the transmitter operates by placing the PDU header of an NVMe PDU immediately after the TCP header of a new TCP segment.

18. The processor-implemented method of claim 15 further comprising:

marking the new TCP segment as being a first TCP segment of the new TCP segment, and, if present, of the one or more additional TCP segments that comprise data related to the NVMe PDU.

19. The processor-implemented method of claim 15 further comprising:

applying TLS (Transport Layer Security) processing on a per NVMe PDU basis.

20. The processor-implemented method of claim 15 further comprising:

marking the new TCP segment, which comprises a beginning of an NVMe PDU, with an indicator indicating that one or more related TCP segments may be processed out of order by the receiver.

* * * * *